United States Patent
Kinnanen

(10) Patent No.: US 6,315,349 B1
(45) Date of Patent: Nov. 13, 2001

(54) CONVERTIBLE

(75) Inventor: Matti Kinnanen, Laitila (FI)

(73) Assignee: Valmet Automotive Oy, Uusikaupunki (FI)

( * ) Notice: Subject to any disclaimer, the term of this patent is extended or adjusted under 35 U.S.C. 154(b) by 0 days.

(21) Appl. No.: 09/707,998

(22) Filed: Nov. 8, 2000

(30) Foreign Application Priority Data

May 5, 2000 (FI) .................................................. 20001055

(51) Int. Cl.⁷ ........................................................ B60J 7/00
(52) U.S. Cl. ................ 296/108; 296/107.01; 296/107.17
(58) Field of Search ............................. 296/108, 107.17, 296/107.01

(56) References Cited

U.S. PATENT DOCUMENTS

| | | | | |
|---|---|---|---|---|
| 4,769,943 | * | 1/1989 | Fukutomi et al. ................. | 296/107 |
| 4,854,634 | * | 8/1989 | Shiraishi et al. .................. | 296/108 |
| 4,895,409 | * | 1/1990 | Konishi et al. .................... | 296/107 |
| 5,265,930 | * | 11/1993 | Klein et al. ........................ | 296/107 |
| 5,490,709 | * | 2/1996 | Rahn .................................. | 296/107 |
| 5,542,735 | * | 8/1996 | Furst et al. ........................ | 296/107 |
| 5,558,388 | * | 9/1996 | Furst et al. ........................ | 296/107 |
| 5,584,522 | * | 12/1996 | Kerner et al. ..................... | 296/108 |
| 5,743,587 | * | 4/1998 | Alexander et al. ................ | 296/108 |
| 5,769,483 | * | 6/1998 | Danzl et al. ....................... | 296/107 |
| 5,806,912 | * | 9/1998 | Ramaciotti et al. ............... | 296/107 |
| 6,039,383 | * | 3/2000 | Jumbor et al. .................... | 296/108 |
| 6,062,628 | * | 5/2000 | Guillez ......................... | 296/107.08 |

FOREIGN PATENT DOCUMENTS

| | | |
|---|---|---|
| 44 45 580 | 12/1995 | (DE) . |
| 44 45 920 | 7/1996 | (DE) . |
| 196 34 510 | 1/1998 | (DE) . |

* cited by examiner

*Primary Examiner*—Joseph D. Pape
*Assistant Examiner*—Kiran B. Patel
(74) *Attorney, Agent, or Firm*—Young & Thompson

(57) ABSTRACT

A folding hard top (3) for a convertible, in which the rear end (10) of the forward top panel (6) has a first cut-out (14) extending in the widthwise direction of the vehicle across a substantial part of the width of the forward top panel. The front edge (15) of the first cut-out is located in the longitudinal direction of the vehicle at a first distance (1) from a first hinge axis (12) forward of said axis. The rearward top panel (7) comprises a second cut-out (16) formed in its front end (11) and extending in the widthwise direction of the vehicle through a substantial part of the width of the rearward top panel. The rear edge (17) of the second cut-out is located in the longitudinal direction at a second distance (L) from the first hinge axis (12) rearward of said axis. A middle top panel (8) is hinged on the rearward top panel (7) near the rear edge (17) of the second cut-out (16) so as to allow it to turn about a horizontal second hinge axis (18). The middle top panel (8) has been fitted to cover the opening (19) formed by the successive first cut-out (14) and second cut-out (16) when the top is in the first position (I). When the top is being folded down from the first position (I) to the second position (II), the middle top panel (8) turns away from the opening (19) into a position between the forward top panel (6) and the rearward top panel (7). When the top is in the second position (II) in the boot (5), the first cut-out (14) and second cut-out (16) are placed one above the other in alignment with each other so that a luggage space (20) is formed in the rear part of the boot (5) in the area of the cut-outs (14, 16).

12 Claims, 8 Drawing Sheets

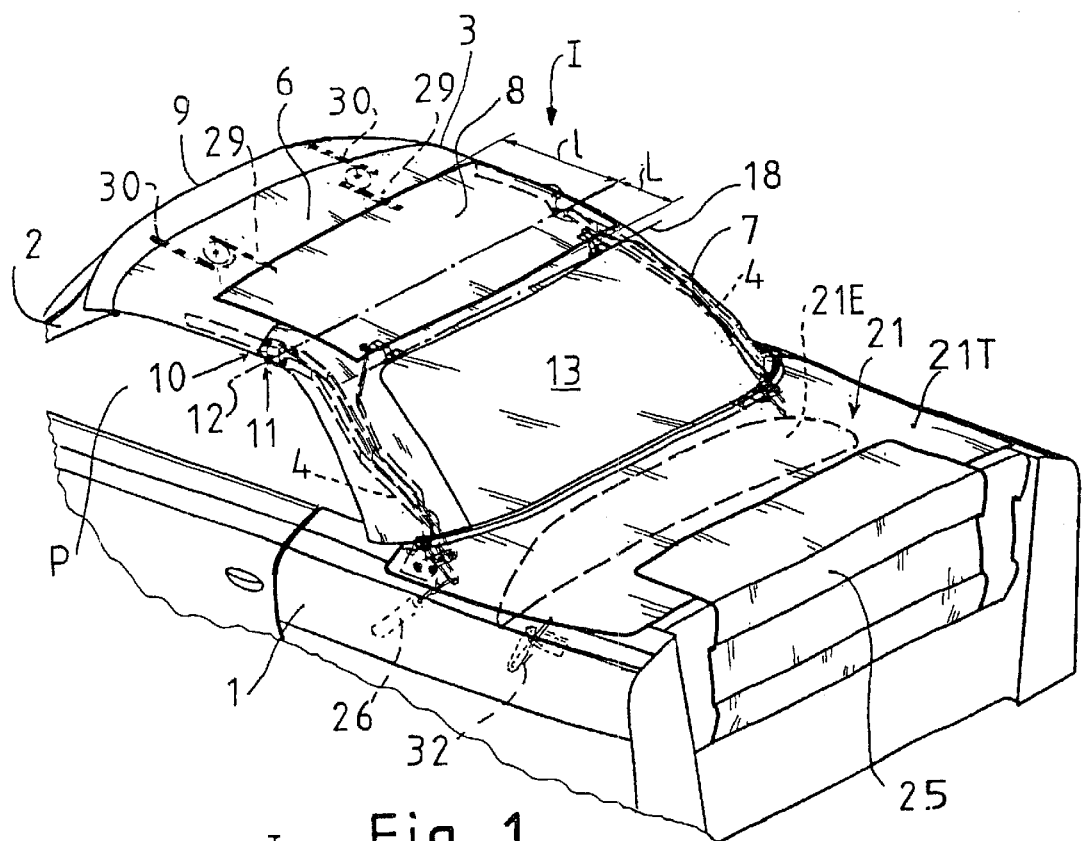
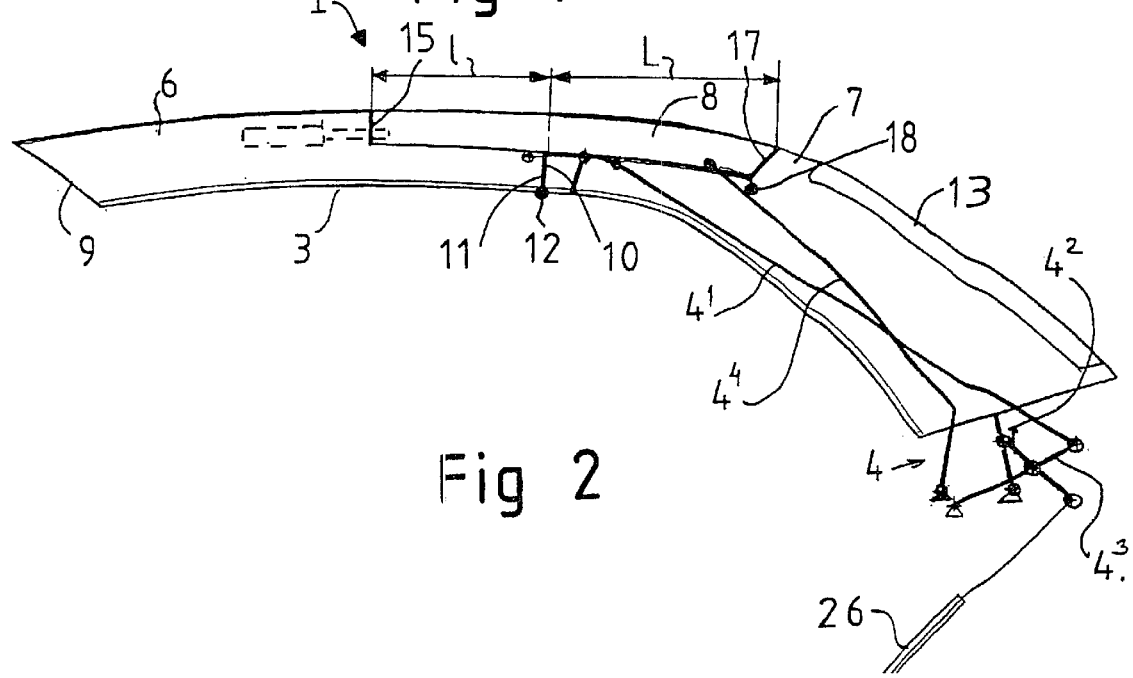

CONVERTIBLE

FIELD OF THE INVENTION

The present invention relates to a convertible car.

BACKGROUND OF THE INVENTION

In prior art, a convertible is known which comprises a folding hard top with a top mechanism pivotally connected to the vehicle body. By means of the top mechanism, the hard top can be moved between a position in which it covers the passenger compartment, hereinafter called the first position, and a position in which the top has been folded down into a boot behind the passenger compartment, hereinafter called the second position. The hard top comprises substantially rigid top panels connected to the top mechanism, which cover the passenger compartment when the top is in the raised first position. These top panels comprise a forward top panel, whose front edge is set against the windscreen frame when the top is in its first position. The top panels further comprise a rearward top panel provided with a rear window and placed rearward of the forward top panel, the rear edge of the forward top panel being hinged on the front edge of the rearward top panel so as to allow the forward top panel to turn about a horizontal first hinge axis.

A problem with this type of prior-art convertibles provided with a folding hard top is that, when the top is in its second position lowered into the boot, there is hardly any space left over for luggage at all because the top takes up the whole space. This problem is not encountered in convertibles provided with a folding hard top and having only front seats and in which the passenger space behind the front seats is used as a stowage for the hard top. However, when the passenger compartment contains both front seats and a back seat as in four-seat convertibles and the back seat is to be usable even when the top is in the open position, then it is necessary to provide a stowage for the lowered top in the conventional luggage compartment, which means that there is actually no luggage space left over. From a prior-art convertible, a solution is known in which a low space is provided below the top lowered into a boot, between the hard top and the bottom of the boot, in which space it is possible to load luggage by pushing the luggage horizontally into said space. However, this solution does not permit normal loading of luggage from above.

OBJECT OF THE INVENTION

The object of the invention is to eliminate the above-mentioned problems.

The convertible of the invention is characterized by what is presented in claim 1.

SUMMARY OF THE INVENTION

According to the invention, the forward top panel comprises a first cut-out formed in its rear end and extending in the widthwise direction of the vehicle through a substantial part of the width of the forward top panel, the front edge of said first cut-out being located in the lengthwise direction of the vehicle at a first distance from a first hinge axis forward of said axis. The rearward top panel comprises a second cut-out formed in its front end and extending in the widthwise direction of the vehicle through a substantial part of the width of the rearward top panel, the rear edge of said second cut-out being located in the lengthwise direction at a second distance from the first hinge axis rearward of said axis. The top panels comprise a middle top panel, which is hinged on the rearward top panel near the rear edge of the second cut-out so as to allow it to turn about a horizontal second hinge axis, said middle top panel being fitted to cover the opening formed by the successive first and second cut-outs when the top is in the first position. When the top is being folded down from the first position to the second position, the middle top panel turns away from the opening into a position between the forward top panel and the rearward top panel, and when the top is in the second position in the boot, the first cut-out and the second cut-out are placed one above the other in alignment with each other, so that a luggage space is formed in the rear part of the boot in the area of the cut-outs.

In an embodiment of the convertible, the first distance and the second distance are substantially equal.

In an embodiment of the convertible, the second cut-out is substantially of the same shape and size as the first cut-out, corresponding to it like a mirror image.

In an embodiment of the convertible, the convertible comprises a cover fitted to cover the boot, said cover comprising a rear end near which the cover is hinged on the rear part of the vehicle body so that it can turn about a horizontal third hinge axis. The cover comprises a third cut-out formed in its rearward area and fitted to be substantially directly above the luggage space so as to provide access to the luggage space.

In an embodiment of the convertible, the convertible comprises a boot lid hinged on the body and fitted to cover the luggage space.

In an embodiment of the convertible, the top mechanism moving the top panels comprises a number of articulated arms and a power means for moving the top mechanism.

In an embodiment of the convertible, the articulated arms and power means are disposed on both sides of the convertible.

In an embodiment of the convertible, the articulated arms and power means are disposed on one side of the convertible.

In an embodiment of the convertible, the articulated arm moving the middle top panel is disposed on a different side of the vehicle in relation to the articulated arms moving the forward top panel and the rearward top panel.

In an embodiment of the convertible, the luggage space is separated from the boot by a partition.

In an embodiment of the convertible, the boot lid is hinged on the partition.

In an embodiment of the convertible, the partition comprises an aperture allowing the boot to be accessed via the luggage space and used as an extension of the luggage space when the top is in the first position.

In an embodiment of the convertible, the passenger compartment of the convertible is provided with front seats and a back seat behind the front seats.

In an embodiment of the convertible, the forward top panel comprises a locking device for locking the forward top panel and the middle top panel together when the top is in the closed first position.

BRIEF DESCRIPTION OF THE DRAWING

In the following, the invention will be described in detail by the aid of a few examples of its embodiments with reference to the attached drawings, wherein FIG. 1 presents an embodiment of the convertible of the invention in an oblique top-rear view with the top in the first position, FIG. 2 presents a diagrammatic side view of the hard top the convertible in FIG. 1.

DETAILED DESCRIPTION OF THE INVENTION

Figure 3:
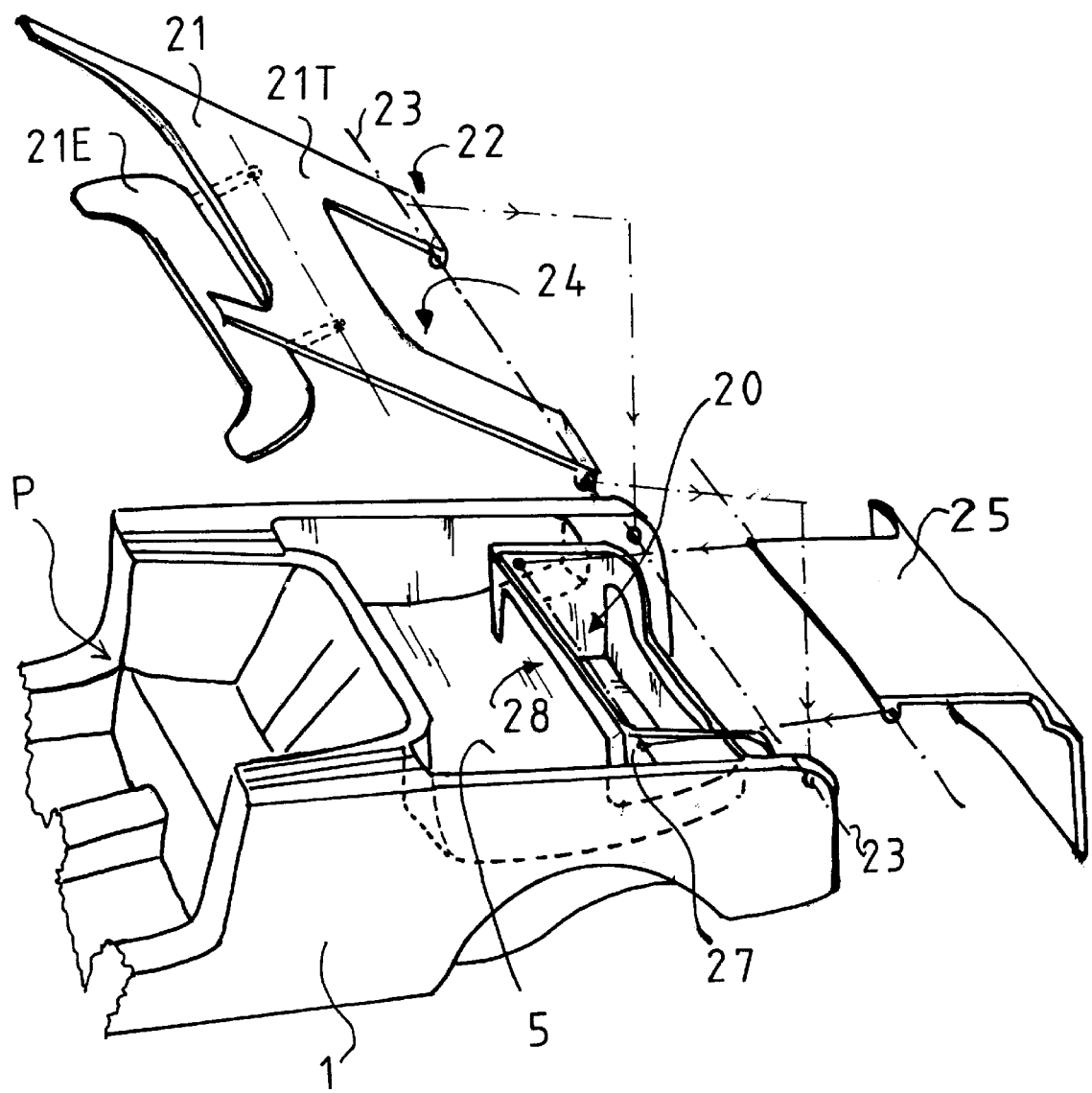
FIG. 3 presents an exploded oblique top-side view of the rear part of the convertible in FIG. 1, FIGS. 4–10 present the convertible of FIGS. 1–3 at different stages of the process of moving the top from the first position shown in FIG. 1 to the second position in the boot.

FIG. 1 presents a convertible comprising a folding hard top 3. The convertible is especially a type of convertible having both front seats and a back seat, e.g. a four-seat convertible. Hinged on the vehicle body 1 is a top mechanism 4 operated by a power means 26, allowing a hard top 3 consisting of rigid top panels 6, 7, 8 to be moved between a closed first position I (see FIGS. 1, 2, 4, 5, 12) and an open second position II (see FIGS. 8, 9, 10, 11). As can be best seen from FIG. 3, behind the passenger compartment P of the convertible there is a boot 5 where the top 3 can be lowered to the aforesaid second position II when opened.

The top panels comprise a forward top panel 6, a rearward top panel 7 and a middle top panel 8. As can be best seen from FIGS. 2, 7 and 9, the top mechanism 4 moves the top panels. The top mechanism 4 comprises a number of articulated arms $4^1$, $4^2$, $4^3$, $4^4$ and a power means 26 for actuating the top mechanism. The structure of the top mechanism 4 will not be described in detail in this context. In the embodiments presented in the figures, articulated arms $4^1$, $4^2$, $4^3$, $4^4$ and a power means 26 are provided on either side of the convertible. Alternatively, they can be disposed on only one side of the vehicle. The articulated arm $4^4$ moving the middle top panel 8 may also be placed on a different side of the vehicle in relation to the articulated arms $4^1$, $4^2$, $4^3$ moving the forward top panel 6 and the rearward top panel 7.

As shown in FIG. 1, in the first position I of the top, the front end 9 of the forward top panel 6 is set against the windscreen frame 2. The rearward top panel 7 with a rear window 13 mounted in it is placed rearward of the forward top panel 6, and the rear end 10 of the forward top panel 6 is hinged on the front end 11 of the rearward top panel 7 so that it can turn about a horizontal first hinge axis 12.

Figure 6:
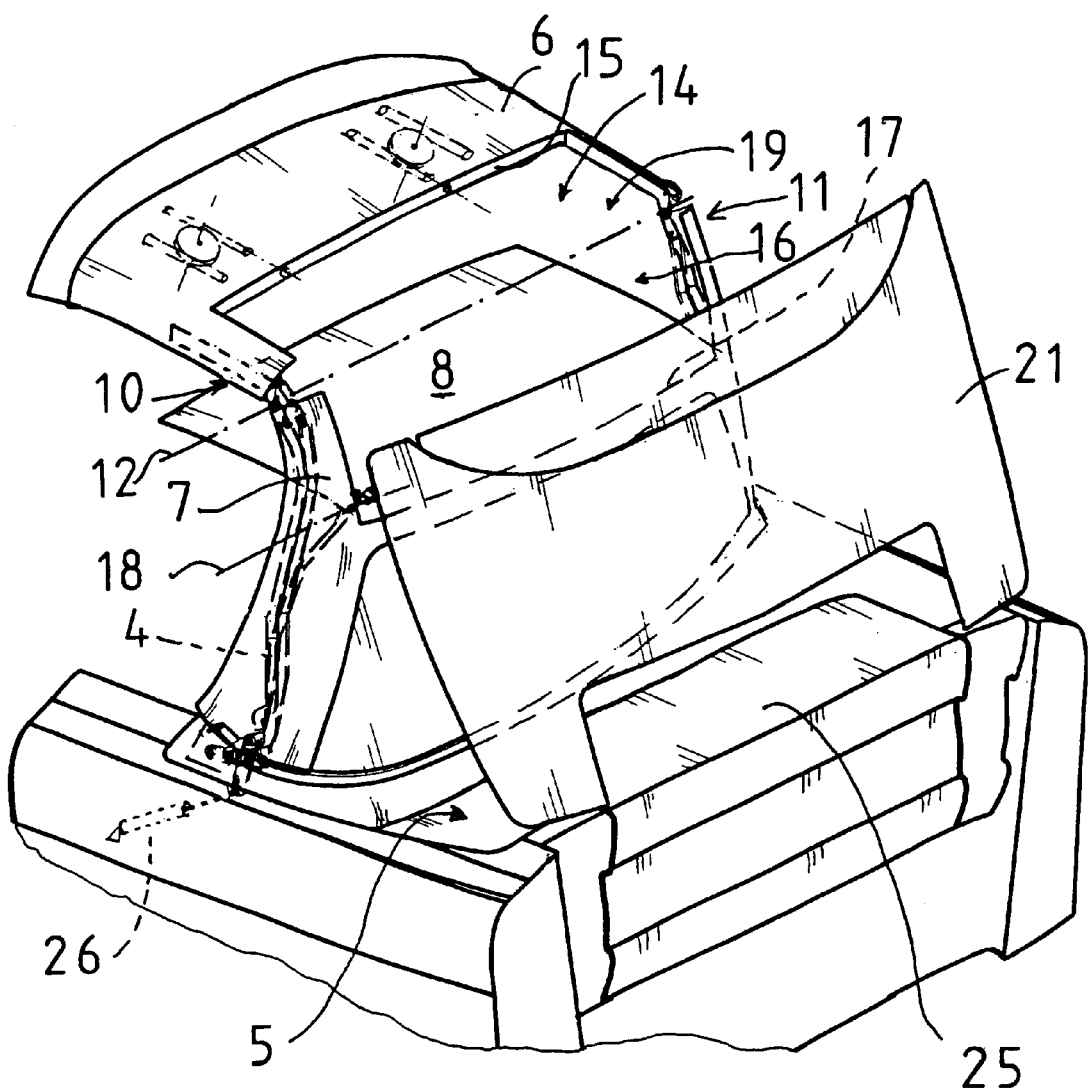
Figure 7:
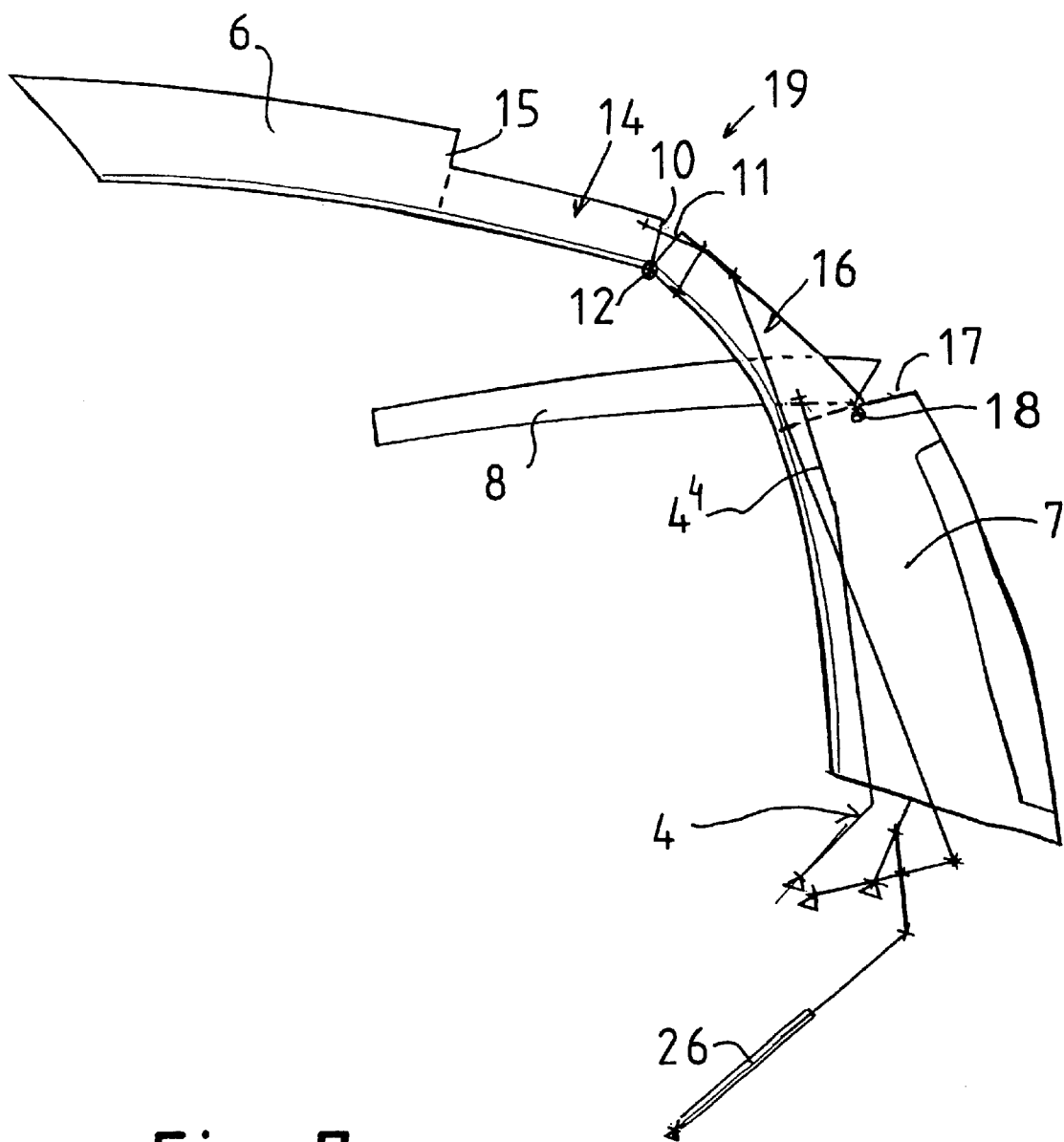
Figure 9:
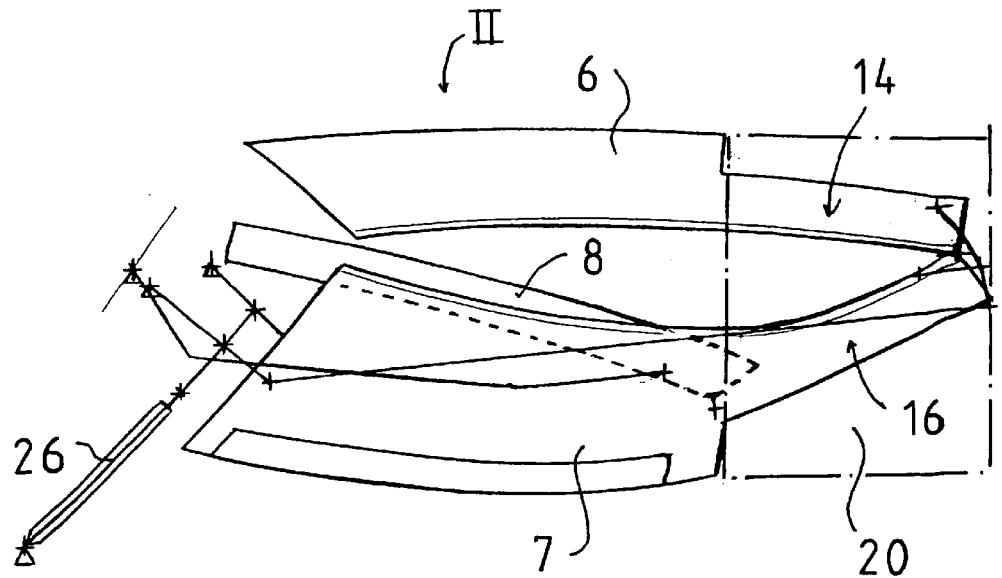

As can be best seen from FIGS. 6, 7 and 9, the forward top panel 6 is provided with a first cut-out 14 formed in its rear end 10 and extending in the widthwise direction of the vehicle through a substantial part of the width of the forward top panel. In the longitudinal direction of the vehicle, the front edge 15 of the first cut-out 14 is located at a first distance 1 from the first hinge axis 12 forward of the latter.

Formed in the front end 11 of the rearward top panel 7 is a second cut-out 16 extending in the widthwise direction of the vehicle through a substantial part of the width of the rearward top panel. The rear edge 17 of the second cut-out is located longitudinally at a second distance L rearward from the first hinge axis 12. The first distance 1 and the second distance L are preferably equal.

The middle top panel 8 is hinged on the rearward top panel 7 so that it can turn about a horizontal second hinge axis 18 near the rear edge 17 of the second cut-out 16. In the first position I of the top, the middle top panel 8 covers the opening 19 formed by the successive first cut-out 14 and second cut-out 16. The second cut-out 16 has substantially the same shape and size as the first cut-out 14, corresponding to it like a mirror image. The forward top panel 6 comprises a locking device 29 for locking the forward top panel 6 and the middle top panel 8 to each other when the top is in the closed first position I.

As can be seen from FIGS. 6, 7, 8 and 9, when the top is being folded down from the first position I to the second position II, the middle top panel 8 turns away from the opening 19 formed by the first cut-out 14 and the second cut-out 16 and is stowed between the forward top panel 6 and the rearward top panel 7. When the top is in the second position II in the boot 5, the first cut-out 14 and the second cutout 16 are placed one above the other in alignment with each other so that a luggage space 20 is formed in the rear part of the boot 5 in the region of the cut-outs 14, 16.

As shown in FIGS. 1, 3, 4, 5, 6, 8, 10 and 11, the convertible comprises a cover 21 fitted to cover the boot 5 used as a stowage for the top. The cover 21 is hinged by its rear end 22 on the rear part of the vehicle body 1 so that it can turn about a horizontal third hinge axis 23 (see FIG. 3). The cover 21 comprises a third cut-out 24 formed in its rear part and located directly above the luggage space 20 so as to allow access to the luggage space.

Further referring to FIG. 3, the luggage space 20 is separated from the boot 5 by a partition 27. A boot lid 25 fitted to cover the luggage space 20 is hinged on the partition 27. The partition 27 comprises an aperture 28 allowing the boot 5 to be accessed via the luggage space and used as an extension of the luggage space 20 when the top is in the first position I.

Next, referring to FIGS. 1–12, the various stages of the process of opening the top will be described.

In FIGS. 1 and 2, the top 3 is in the first position I over the passenger compartment P. The top 3 is locked to the windscreen frame 2 by means of a locking device 30 which is mounted on the front end 9 of the forward top panel and which may be a conventional known locking device, e.g. comprising a pin that engages a recess in the windscreen frame 2. The forward top panel 6 and the middle top panel 8 are also locked to each other by a locking device 29, which may comprise a pin that engages a hole or recess in the middle top panel 8. The locking devices 29 and 30 may be designed to be operated by the same actuator, preferably simultaneously.

Figure 4:
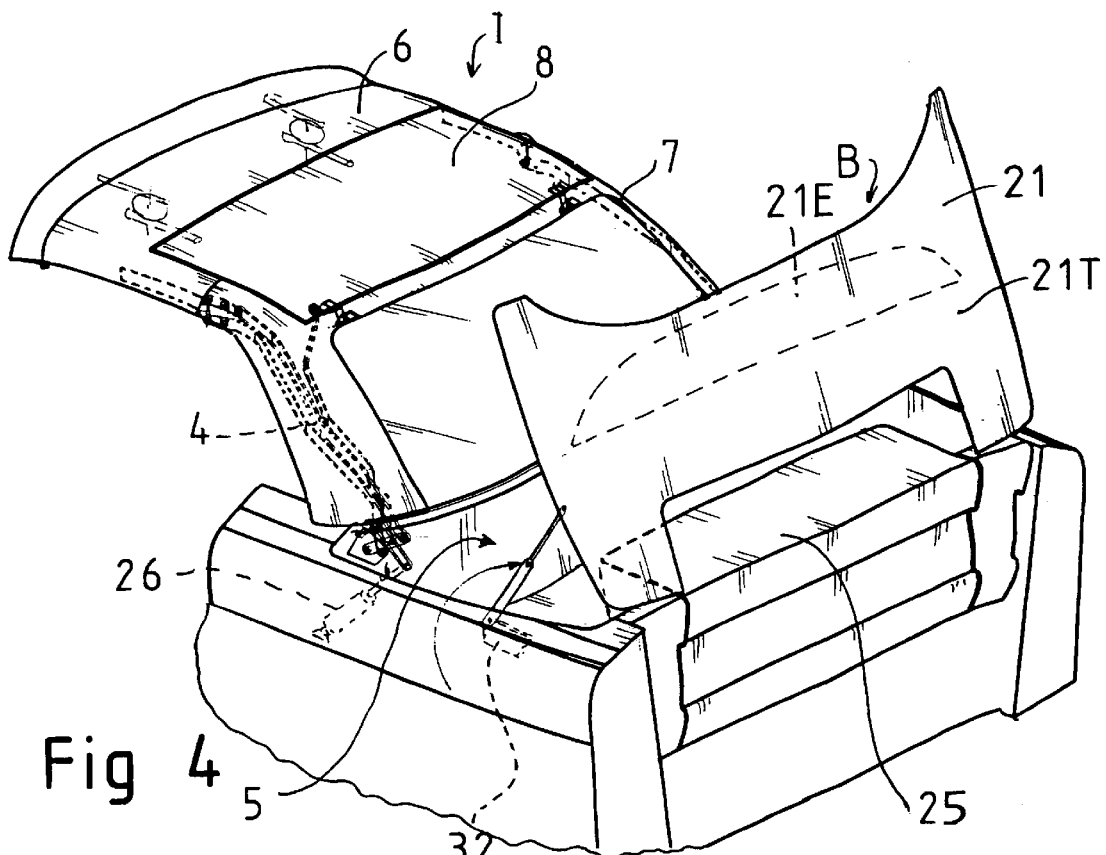

In FIG. 4, the top is still in the first position I. The boot cover 21 has been divided into two parts in a manner described in the Finnish patent application FI 20000684 by the same applicant, in other words, the cover comprises a rearward cover 21T, which is hinged by its rear end on the vehicle body 1, and a forward cover 21E connected to the rearward cover so that it can be turned from a first position A (FIG. 5) adjacent to the rearward cover to a second position B (FIG. 4) substantially completely below it. The dividing joint 31 between the front edge of the rearward cover 21T and the rear edge of the forward cover has been so shaped that it substantially follows the shape of the rear edge of the rearward top panel 7 and is sealed against it so that, when the top 3 is in its first position and the forward cover 21E has been moved to the second position B, the cover 21 can be turned to the open position past the substantially horizontal rear edge of the rearward top panel without being hindered by it. In FIG. 4, the boot cover 21 has been opened by a power means 32 and the forward cover 21E is in position B under the rearward cover 21T.

Figure 5:
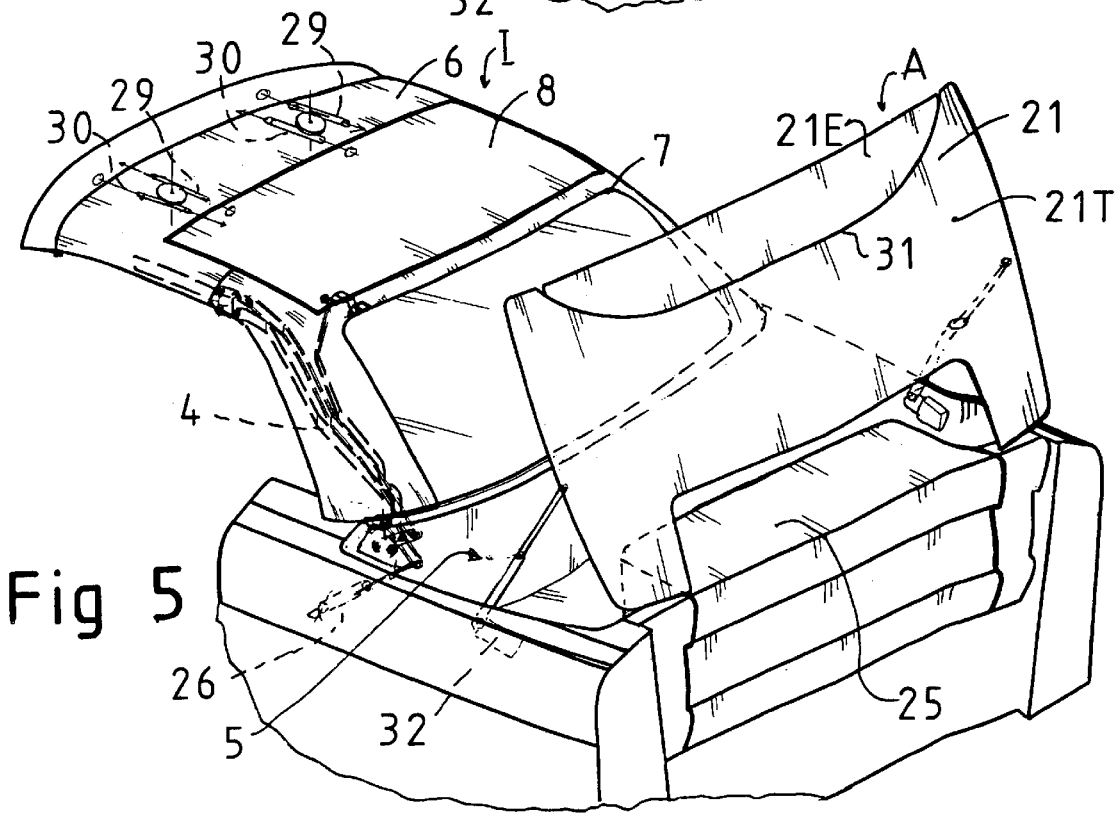

In FIG. 5, the top is still in the first position I, the boot cover 21 is open and the forward cover 21E is in the position A adjacent to the rearward cover 21T. The locking devices 29, 30 have been released, so it is now possible to start moving the top 3 toward the open position II by means of the top mechanism 4 and the power means 26.

In FIGS. 6 and 7, the top has been slid somewhat toward the open position, and the forward top panel 6 and rearward top panel 7 have turned in relation to each other about the first hinge axis 12 while the middle top panel 8 has simultaneously turned about the second hinge axis 18 in relation to the rearward top panel 7, the opening 19 formed by the first cut-out 14 together with the second cut-out 16 being thus uncovered.

Figure 8:
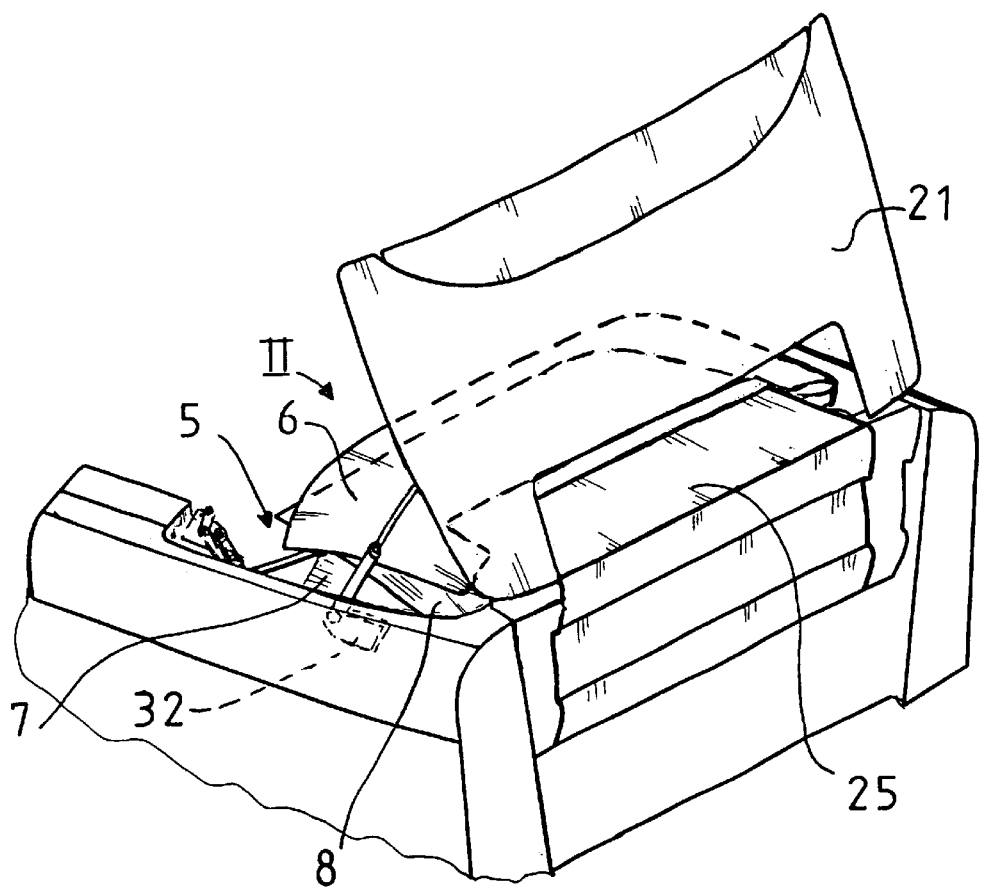

In FIGS. 8 and 9, the top has been lowered to the second position II into the boot 5, where the middle top panel 8 lies between the forward top panel 6 and the rearward top panel 7 while the first cut-out 14 and the second cut-out 16 are located one above the other in alignment with each other so that a luggage space 20 has been formed in the region of the cut-outs 14, 16 in the rear part of the boot 5.

Figure 10:
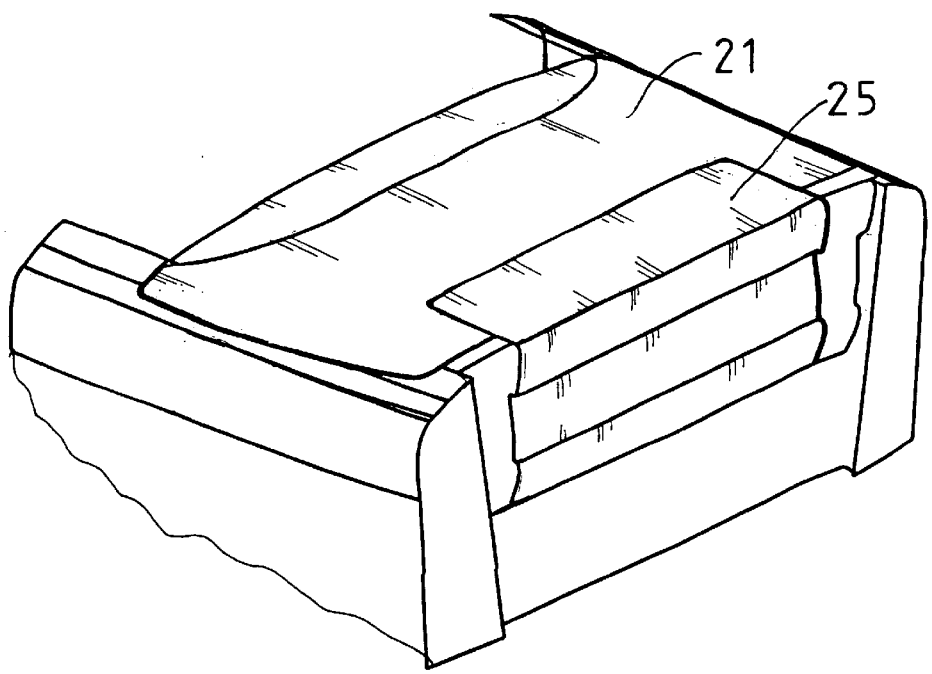

In FIG. 10, the boot cover 21 has been closed by the power means 32. The boot lid 25 covering the luggage space 20 is also closed.

Figure 11:
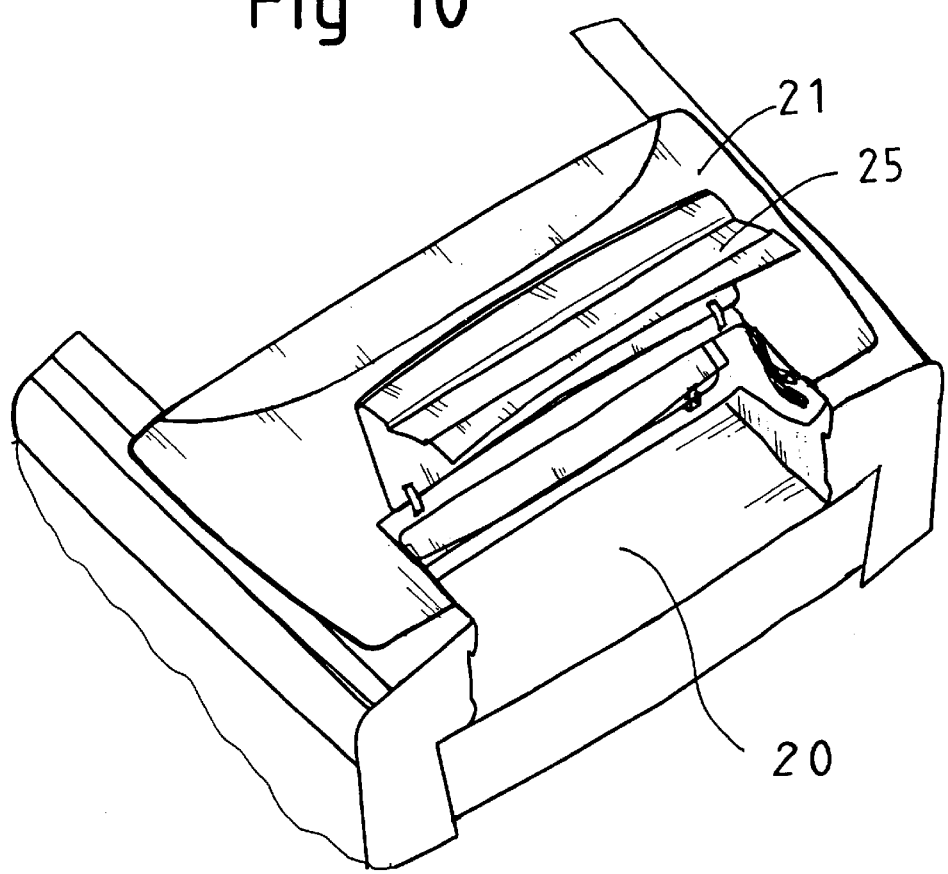
FIG. 11 presents the convertible with the top in the second position and with the boot lid open to allow access to the luggage space.
Figure 12:
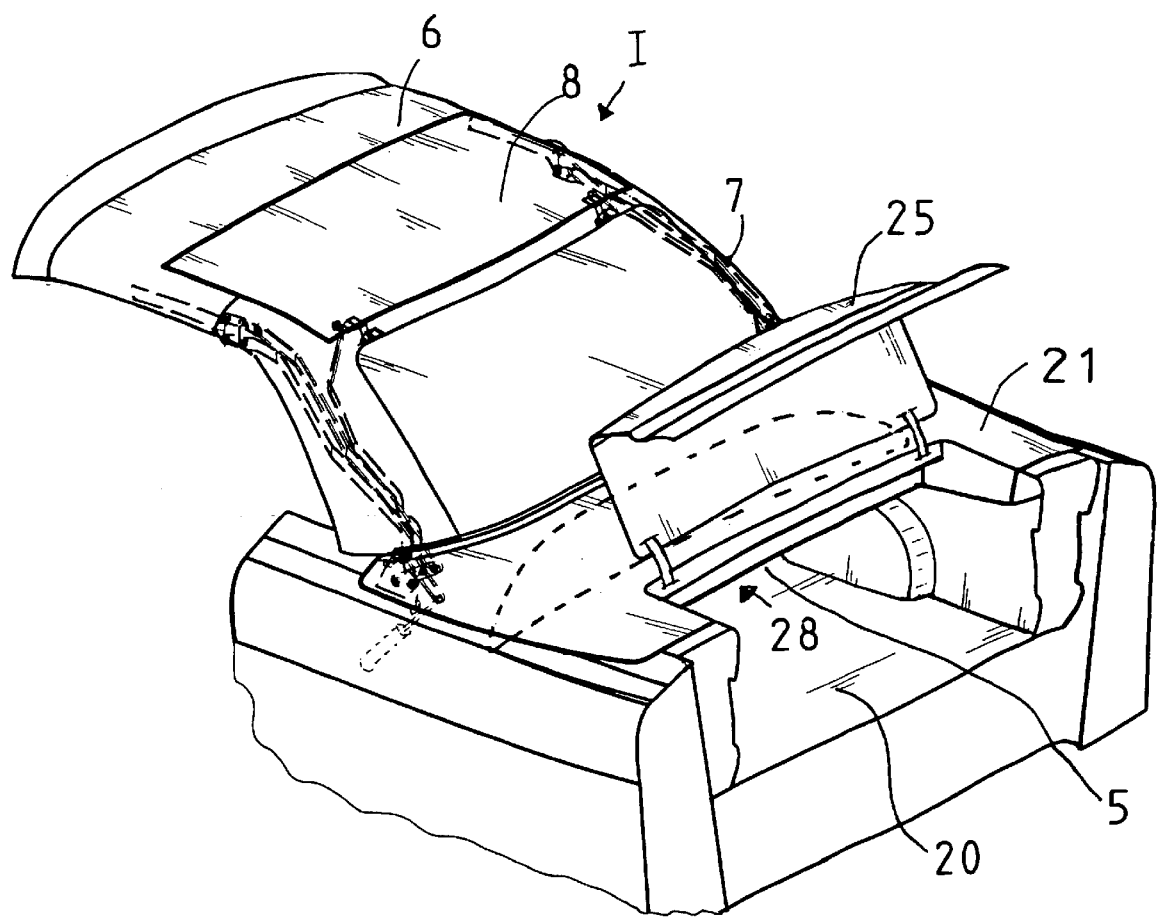
FIG. 12 presents the convertible with the top in the first position and with the boot lid open to allow access to the luggage space.

FIGS. 11 and 12 illustrate the circumstance that the luggage space 20 made available by the new top construction can be used and the boot lid 25 opened both when the top is in the second position II in the boot 5 (FIG. 11) and when the top is in the first position covering the passenger compartment (FIG. 12), in which position especially the boot 5 serving as a stowage for the top can also be used as an extension of the luggage space 20.

The invention is not restricted to the examples of its embodiments described above; instead, many variations are possible within the scope of the inventive idea defined in the claims.

What is claimed is:

1. Convertible car comprising
    a body (1) comprising a windscreen frame (2),
    a folding hard top (3) comprising a top mechanism (4) hinged on the body, the top being movable between a closed first position (I) and an open second position (II) by means of said mechanism,
    a boot (5) for the stowage of the top behind the passenger compartment, into which boot the top, when opened, can be lowered to the second position (II),
    substantially rigid top panels (6, 7, 8) connected to the top mechanism (4) and covering the passenger compartment when the top is in the raised first position (I), said top panels comprising
        a forward top panel (6) having a front end (9), which in the first position (I) of the top is set against the windscreen frame (2), and a rear end (10);
        a rearward top panel (7) placed rearward of the forward top panel and having a front end (11), the rear end (10) of the forward top panel (6) being hinged on said front end (11) so that it can turn about a horizontal first hinge axis (12), a rear window (13) being mounted in the rearward top panel (7), characterized in that
        the forward top (6) panel comprises a first cut-out (14) formed in its rear end (10) and extending in the widthwise direction of the vehicle through a substantial part of the width of the forward top panel, the front edge (15) of said first cut-out (14) being located in the longitudinal direction of the vehicle at a first distance (1) from the first hinge axis (12) forward of said axis;
        the rearward top panel (7) comprises a second cut-out (16) formed in its front end (11) and extending in the widthwise direction of the vehicle through a substantial part of the width of the rearward top panel, the rear edge (17) of said second cut-out being located in the longitudinal direction at a second distance (L) from the first hinge axis rearward of said axis;
        the top panels comprise a middle top panel (8) which is hinged on the rearward top panel (7) near the rear edge of the second cut-out (16) so as to allow it to turn about a horizontal second hinge axis (18), said middle top panel (8) being fitted to cover the opening (19) formed by the successive first cut-out (14) together with the second cut-out (16) when the top is in the first position (I);
        and that when the top is being folded down from the first position (I) to the second position (II), the middle top panel (8) turns away from the opening (19) into a position between the forward top panel (6) and the rearward top panel (7), and when the top is in the second position (II) in the boot (5), the first cut-out (14) and the second cut-out (16) are placed one above the other in alignment with each other, so that a luggage space (20) is formed in the rear part of the boot (5) in the area of the cut-outs (14, 16).

2. Convertible as defined in claim 1, characterized in that the first distance (1) and the second distance (L) are substantially equal.

3. Convertible as defined in claim 1, characterized in that the second cut-out (16) is substantially of the same shape and size as the first cut-out (14), corresponding to it like a mirror image.

4. Convertible as defined in claim 1, characterized in that the convertible comprises a cover (21) fitted to cover the boot (5), said cover comprising a rear end (22) near which the cover is hinged on the rear part of the vehicle body (1) so that it can turn about a horizontal third hinge axis (23); and that the cover (21) comprises a third cut-out (24) formed in its rearward part and fitted to be substantially directly above the luggage space (20) to allow access to the luggage space.

5. Convertible as defined in claim 1, characterized in that the convertible comprises a boot lid (25) hinged on the body (1) and fitted to cover the luggage space (20).

6. Convertible as defined in claim 1, characterized in that the top mechanism (4) moving the top panels (6, 7, 8) comprises a number of articulated arms ($4^1$, $4^2$, $4^3$, $4^4$) and a power means (26) for moving the top mechanism.

7. Convertible as defined in claim 6, characterized in that the articulated arms ($4^1$, $4^2$, $4^3$, $4^4$) and power means (26) are disposed on both sides or on one side of the vehicle.

8. Convertible as defined in claim 6, characterized in that the articulated arm ($4^4$) moving the middle top panel (8) is disposed on a different side of the vehicle in relation to the articulated arms ($4^1$, $4^2$, $4^3$) moving the forward top panel (6) and the rearward top panel (7).

9. Convertible as defined in claim 1, characterized in that the luggage space (20) is separated from the boot (5) by a partition (27).

10. Convertible as defined in claim 9, characterized in that the boot lid (25) is hinged on the partition (27).

11. Convertible as defined in claim 9, characterized in that the partition (27) comprises an aperture (28) allowing the boot (5) to be accessed via the luggage space (20) and used as an extension of the luggage space when the top is in the first position (I).

12. Convertible as defined in claim 1, characterized in that the forward top panel (6) comprises a locking device (29) for locking the forward top panel (6) and the middle top panel (8) together when the top is in the closed first position (I).

\* \* \* \* \*